United States Patent
Tymofieiev et al.

(10) Patent No.: US 12,112,212 B2
(45) Date of Patent: Oct. 8, 2024

(54) CONTROLLING SYSTEM LOAD BASED ON MEMORY BANDWIDTH

(71) Applicant: Google LLC, Mountain View, CA (US)

(72) Inventors: Dmytro Tymofieiev, Santa Clara, CA (US); Jaideep Singh, Dublin, CA (US); Kusum Kumar Madarasu, Cupertino, CA (US)

(73) Assignee: Google LLC, Mountain View, CA (US)

( * ) Notice: Subject to any disclaimer, the term of this patent is extended or adjusted under 35 U.S.C. 154(b) by 668 days.

(21) Appl. No.: 17/186,708

(22) Filed: Feb. 26, 2021

(65) Prior Publication Data

US 2022/0276906 A1 Sep. 1, 2022

(51) Int. Cl.
| | |
|---|---|
| *G06F 9/50* | (2006.01) |
| *G06F 11/34* | (2006.01) |
| *G06F 12/02* | (2006.01) |
| *G06N 20/00* | (2019.01) |
| *H04L 41/0896* | (2022.01) |

(52) U.S. Cl.
CPC .......... *G06F 9/5083* (2013.01); *G06F 9/5016* (2013.01); *G06F 11/3442* (2013.01); *G06F 12/0238* (2013.01); *H04L 41/0896* (2013.01); *G06F 9/505* (2013.01); *G06F 11/3409* (2013.01); *G06F 2209/508* (2013.01); *G06F 2212/1024* (2013.01); *G06N 20/00* (2019.01)

(58) Field of Classification Search
None
See application file for complete search history.

(56) References Cited

U.S. PATENT DOCUMENTS

| | | |
|---|---|---|
| 7,284,067 B2 | 10/2007 | Leigh |
| 8,429,630 B2 | 4/2013 | Nickolov et al. |
| 8,910,153 B2 | 12/2014 | Gupta et al. |
| 9,055,076 B1 | 6/2015 | Sorenson, III et al. |
| 9,749,208 B2 | 8/2017 | Skjolsvold et al. |

(Continued)

FOREIGN PATENT DOCUMENTS

| | | |
|---|---|---|
| AU | 2015222811 B2 | 9/2017 |
| WO | 2018/014566 A1 | 1/2018 |

OTHER PUBLICATIONS

Ewert, J. Estimating I/O Memory Bandwidth. Karlsruher Institute for Technology. Dec. 28, 2016. 86 pages.

(Continued)

*Primary Examiner* — Abu Zar Ghaffari
(74) *Attorney, Agent, or Firm* — Lerner David LLP

(57) ABSTRACT

Methods, systems, and apparatus, including computer-readable storage media for load. A load balancer can input data to the plurality of computing devices configured to process the input data according to a load-balancing distribution. The load balancer can receive from a first computing device of the plurality of computing devices, data characterizing memory bandwidth for a memory device on the first computing device and over a period of time. The load balancer can determine, at least from the data characterizing the memory bandwidth and a memory bandwidth saturation point for the first computing device, that the first computing device can process additional data within a predetermined latency threshold. In response to the determining, the load balancer can send the additional data to the first computing device.

18 Claims, 6 Drawing Sheets

(56) References Cited

U.S. PATENT DOCUMENTS

| | | | |
|---|---|---|---|
| 9,774,512 B1 | 9/2017 | Zuevsky | |
| 9,898,409 B2 | 2/2018 | Sethia et al. | |
| 2010/0192158 A1* | 7/2010 | Gaither | G06F 9/5088 |
| | | | 718/105 |
| 2012/0054329 A1* | 3/2012 | Gulati | H04L 67/1001 |
| | | | 709/224 |
| 2014/0095691 A1* | 4/2014 | Ganguli | H04L 41/5009 |
| | | | 709/224 |
| 2017/0272343 A1* | 9/2017 | Giles | H04L 43/0888 |
| 2018/0150333 A1* | 5/2018 | Alapati | G06F 9/5044 |
| 2018/0210531 A1* | 7/2018 | Shahneous Bari | G06F 3/0679 |
| 2018/0219741 A1* | 8/2018 | Thompson | H04L 67/01 |
| 2019/0050265 A1* | 2/2019 | Vijayaraghavan | G06N 3/08 |
| 2019/0068464 A1 | 2/2019 | Bernat et al. | |
| 2019/0190805 A1* | 6/2019 | Hunt | G06F 9/4881 |
| 2019/0258561 A1* | 8/2019 | Loteanu | G06F 16/9024 |
| 2019/0334771 A1* | 10/2019 | Milojicic | G06F 11/3051 |
| 2020/0125411 A1* | 4/2020 | Goodman | G06F 9/505 |
| 2020/0177507 A1* | 6/2020 | Thanasekaran | G06F 3/0613 |
| 2020/0195567 A1* | 6/2020 | Selvidge | H04L 43/0864 |
| 2020/0259763 A1* | 8/2020 | Guim Bernat | H04L 47/72 |
| 2020/0287961 A1 | 9/2020 | Snider et al. | |
| 2020/0404051 A1* | 12/2020 | Guniguntala | H04L 67/10 |
| 2021/0042116 A1* | 2/2021 | Schatz | G06F 9/5061 |
| 2022/0357998 A1* | 11/2022 | Chen | G06F 3/067 |

OTHER PUBLICATIONS

Rastogi, "Intelligent Autoscaling | Application Performance Monitoring with Avi" [online]. Nov. 23, 2016. [Retrieved Jan. 27, 2021]. Retrieved from the internet: <https://blog.avinetworks.com/autoscaling-metrics>, 7 pages.

Ewert, "Estimating I/O Memory Bandwidth" [online]. Dec. 28, 2016. [Retrieved Jan. 27, 2021]. Retrieved from the internet: <https://os.itec.kit.edu/downloads/DA_2016_Ewert_Estimating_IO_Memory_Bandwidth.pdf>, 86 pages.

"Detecting Memory Bandwidth Saturation in Threaded Applications" [online]. Mar. 1, 2010. [Retrieved Jan. 27, 2021]. Retrieved from the internet: <https://software.intel.com/content/www/us/en/develop/articles/detecting-memory-bandwidth-saturation-in-threaded-applications.html>, 6 pages.

Geng, Li, and Wang, "Horizontal or Vertical? A Hybrid Approach to Large-Scale Distributed Machine Learning." ScienceCloud '19, Jun. 25, 2019, pp. 1-4. Phoenix, Arizona, USA. [Retrieved Jan. 27, 2021]. Retrieved from the Internet: <https://dl.acm.org/doi/pdf/10.1145/3322795.3331461>, 4 pages.

Lo. Reconciling High Efficiency with Low Latency in the Datacenter. Jun. 1, 2015. Retrieved from the Internet: <http://csl.stanford.edu/~christos/publications/2015.david_lo.phd_thesis.pdf>. 151 pages.

Mars et al. Bubble-up: Increasing Utilization in Modern Warehouse Scale Computers via Sensible Co-Locations. Dec. 3, 2011. 2011 44th Annual IEEE/ACM International Symposium on Microarchitecture (MICRO), ACM. 12 pages.

Zhu et al. Kelp: QoS for Accelerated Machine Learning Systems. Feb. 16, 2019. 2019 IEEE International Symposium on High Performance Computer Architecture (HPCA). pp. 172-184.

Extended European Search Report for European Patent Application No. 21185032.6 dated Dec. 16, 2021. 10 pages.

* cited by examiner

CONTROLLING SYSTEM LOAD BASED ON MEMORY BANDWIDTH

BACKGROUND

Hardware accelerators include devices configured for efficiently performing different types of operations, such as arithmetic operations on matrices. A hardware accelerator can be implemented as part of a computing device, such as a server, and coupled to other hardware accelerators, memory devices, and/or general-purpose processors, such as central processing units (CPUs). Multiple computing devices can be in communication together as a distributed system and be configured to receive and process incoming data. A load balancer implemented in software and/or hardware can monitor incoming data traffic to the distributed system. The load balancer generally balances incoming traffic according to a load balancing strategy for determining how to distribute data to available computing devices.

Often, a load balancer does not perform its load balancing efficiently, which can be demonstrated through high response times for computing devices of the distributed network to respond to incoming data, and by the number of dropped requests or queries to the distributed system. One reason for these high response times is because load balancers rely on general signals like processor utilization or total memory capacity for load balancing, which do not adequately address underlying causes of bottlenecks.

BRIEF SUMMARY

Methods, systems, and apparatus, including non-transitory computer-readable storage media are provided for efficiently load balancing incoming data traffic to computing devices of a distributed system. A load balancer can apply a respective memory bandwidth saturation point and current memory bandwidth for each computing device as a metric for load balancing incoming data.

Memory bandwidth refers to the rate at which data is transferred between memory and another component of a system or device. Memory bandwidth can be measured in data transferred over a unit of time, such as gigabytes per second (GB/s). The memory bandwidth saturation point is a particular memory bandwidth after which additional data sent to a computing device causes the access latency to transfer data to and from memory devices and processors of the computing device to increase beyond a linear or constant rate, e.g., exponentially.

Computing devices operating at a memory bandwidth at or beyond this point are considered saturated. A computing device can be considered saturated well before the computing device is operating at its theoretical maximum memory bandwidth, accelerators utilization, and/or processor utilization. For example, the theoretical maximum memory bandwidth for a computing device may be 100 GB/s, but its saturation point may be 70 GB/s. By accounting for the memory bandwidth saturation point of a computing device, a load balancer can efficiently distribute data over conventional load balancing approaches.

An aspect is directed to a method, including: sending, by one or more processors, input data to a plurality of computing devices configured to process the input data, wherein a respective portion of the input data is sent to each of the plurality of computing devices according to a load-balancing distribution; receiving, from a first computing device of the plurality of computing devices, data characterizing memory bandwidth for a memory device on the first computing device and over a period of time; determining, at least from the data characterizing the memory bandwidth and a memory bandwidth saturation point for the first computing device, that the first computing device can process additional data within a predetermined latency threshold; and in response to the determining, sending the additional data to the first computing device.

Another aspect is directed to a system including one or more processors; a plurality of computing devices; and one or more non-transitory computer readable storage media coupled to the one or more processors and storing instructions, which, when executed by the one or more processors, causes the one or more processors to perform operations including: sending input data to the plurality of computing devices configured to process the input data, wherein a respective portion of the input data is sent to each of the plurality of computing devices according to a load-balancing distribution; receiving, from a first computing device of the plurality of computing devices, data characterizing memory bandwidth for a memory device on the first computing device and over a period of time; determining, at least from the data characterizing the memory bandwidth and a memory bandwidth saturation point for the first computing device, that the first computing device can process additional data within a predetermined latency threshold; and in response to the determining, sending the additional data to the first computing device.

Another aspect is directed to one or more non-transitory computer-readable storage media encoded with instructions that, when executed by one or more processors, cause the one or more processors to perform operations including: sending input data to a plurality of computing devices configured to process the input data, wherein a respective portion of the input data is sent to each of the plurality of computing devices according to a load-balancing distribution; receiving, from a first computing device of the plurality of computing devices, data characterizing memory bandwidth for a memory device on the first computing device and over a period of time; determining, at least from the data characterizing the memory bandwidth and a memory bandwidth saturation point for the first computing device, that the first computing device can process additional data within a predetermined latency threshold; and in response to the determining, sending the additional data to the first computing device.

In some instances, the memory bandwidth for the first computing device includes measurements of the rate of data transferred between a processor and the memory device during each of a plurality of time intervals within the time period.

In some instances, the method or operations include determining the memory bandwidth saturation point for the first computing device, including: receiving measures of access latency at different memory bandwidths, each memory bandwidth corresponding to a respective measure of access latency, wherein access latency is a measure of time to access data stored on the memory device; and identifying a first memory bandwidth as the memory bandwidth saturation point for the first computing device, wherein memory bandwidths higher than the first memory bandwidth correspond to measures of access latency that exceed the predetermined latency threshold.

In some instances, the memory bandwidth saturation point is less than the maximum memory bandwidth attainable for the computing device.

In some instances, the input data includes a request to the first computing device to return output data in response to the request; the predetermined latency threshold is at least partially based on a service level objective defining a maximum delay for the first computing device to respond to the request.

In some instances, the first computing device is configured to execute a machine learning model, and wherein the request to the first computing device is a request to process data through the machine learning model to return the output data.

In some instances, determining that the first computing device can receive additional data further includes determining that the first computing device can receive additional data based on respective performance metrics for processors and/or memory devices implemented on the first computing device.

In some instances, the methods or operations include determining that the first computing device cannot process additional data within the predetermined latency threshold, and in response, sending the additional data to a second computing device different from the first computing device.

In some instances, the first computing device includes one or more general-purpose processors, one or more memory devices, and one or more hardware accelerators; and wherein the first computing device is configured to: receive the input data and, process the input data through a machine learning model, wherein processing the input data includes executing a first portion of a machine learning model using the one or more general-purpose processors, and executing a second portion of the machine learning model different from the first portion and using the one or more hardware accelerators.

Other implementations include computer systems, apparatus, and computer programs recorded on one or more computer storage devices, each configured to perform actions of the methods.

DETAILED DESCRIPTION

Overview

Figure 1:
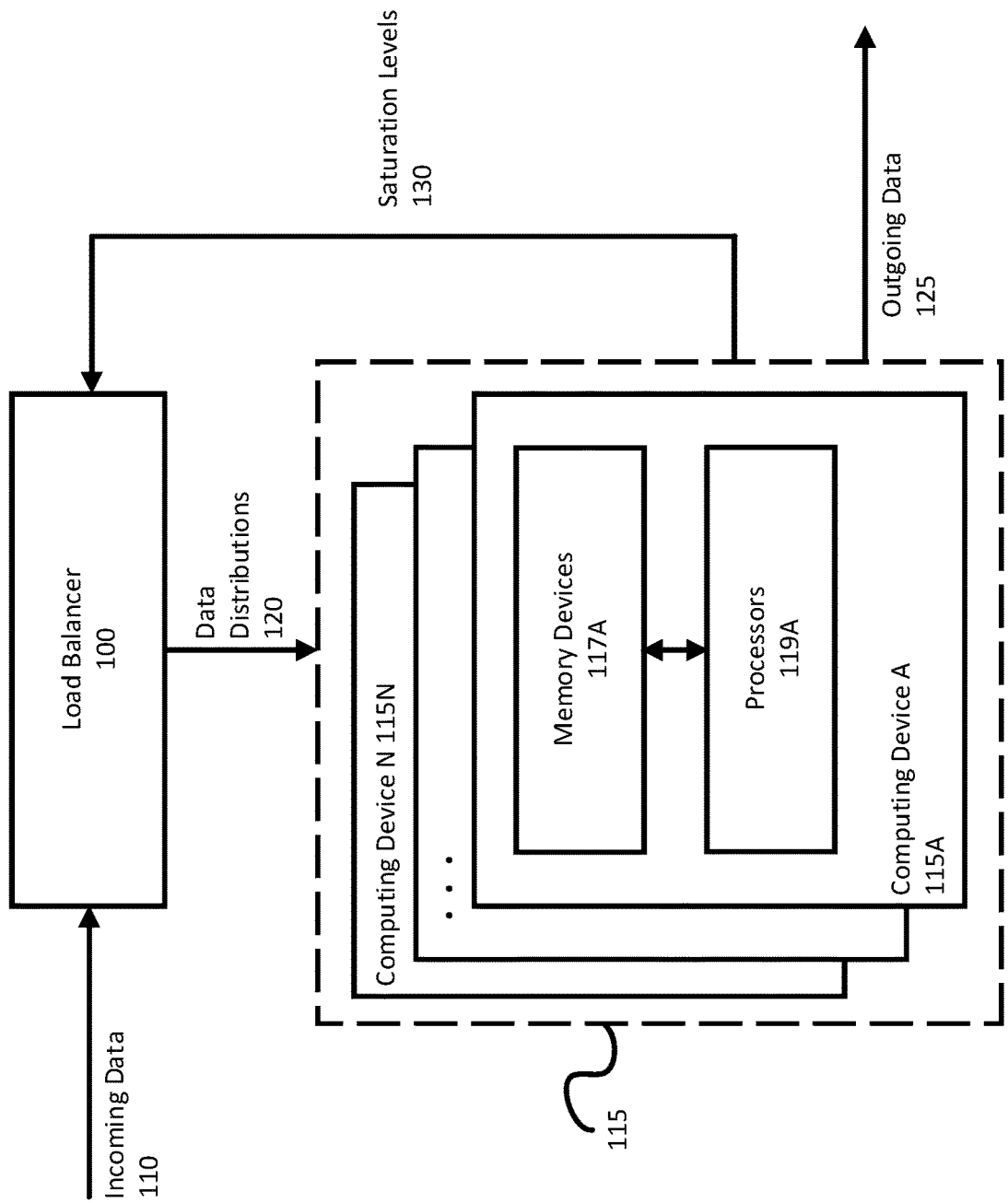
FIG. 1 is a block diagram of an example load balancer distributing data traffic to a distributed network of computing devices, according to aspects of the disclosure.

Aspects of the disclosure generally provide for efficient load balancing of incoming data traffic to a network of computing devices, by identifying and using a memory bandwidth saturation point for each device as a load balancing signal. Memory bandwidth refers to the rate at which data is transferred between memory and another component of a system or device. Memory bandwidth can be measured in data transferred over a unit of time, such as gigabytes per second (GB/s). The memory bandwidth saturation point is a particular memory bandwidth after which additional data sent to a computing device causes the access latency to transfer data to and from memory devices and processors of the computing device to increase beyond a linear or constant rate, e.g., exponentially. Computing devices operating at or beyond this point are considered saturated.

Load balancers relying only on total memory capacity and/or processor utilization of computing devices for load balancing do not adequately capture potential bottlenecks that can occur in the execution of tasks that rely heavily on transferring data between general-purpose processors, hardware accelerators, and memory devices. The memory bandwidth saturation point can occur well below the theoretical maximum bandwidth available on a computing device between processors and memory devices. A computing device may appear available to handle additional data when considering processor load, hardware accelerator load, and/or and available memory alone, but this does take into consideration a potential bottleneck introduced in the amount of data necessary to transfer between memory and processors, as part of performing a task on the computing device. One reason for this is because reaching the maximum physically accessible bandwidth can cause data to be queued for processing instead of being immediately processed, until bandwidth is available, which can increase overall latency.

Determining merely whether a computing device is operating at or close to manufacturer-reported limits is not an efficient signal for a load balancer. Manufacturer-reported limits can include technical operating characteristics provided by the manufacturer and/or designer of computing device components, such as the max clock speed for a processor, or total memory capacity of a memory device. A computing device operating at or near reported limits may actually perform worse, such as, with higher overall latency between input and output to the computing device, versus operating at its saturation point as described herein. If the distributed system is operating according to a latency service level objective (SLO) or some other predetermined maximum tolerated latency, the increased overall latency can result in degraded user experiences and/or failed query responses that timeout as a result of the latency between query and response to a user device sending the query.

The saturation point as described herein is not a manufacturer-reported limit. Instead, the load balancer or another component of the distributed system can measure the saturation point individually for each computing device. The saturation point can vary between computing devices, for example because of different hardware configurations for each device.

A load balancer configured as described herein can take into account data received from computing devices representing their current memory bandwidth over a period of time. The current memory bandwidth over a period of time can be aggregated and represented as the saturation level for the computing device. A load balancer can compare the saturation level of a computing device, with the saturation point for the computing device in performing that task. In balancing additional data sent to the distributed system, the load balancer accounts for whether additional data would cause the computing device to operate at or in excess of its saturation point, before determining whether to distribute the additional data.

Aspects of the disclosure provide for robust techniques for reducing or eliminating latency of a distributed system in providing output, with efficient load balancing. A load balancer configured as described herein can quickly determine bottlenecks in the transfer of data between memory devices and processors, even when processors and memory devices individually are not bottlenecked in performing a particular task, such as executing a machine learning model. By accounting for the memory bandwidth saturation point of a computing device, a load balancer as described herein can efficiently distribute data over conventional load balancing approaches. This is at least because the load balancer can be implemented to distribute data so as to not cause the computing device to exceed its memory bandwidth saturation point.

In some examples, the load balancer can be used to predict performance for a distributed system of computing devices, before hardware modifications to the system are made. In the context of processors, especially hardware accelerators, the state-of-the-art for hardware accelerators can outpace improvements in memory transfer between the processors and memory devices, such as RAM. The load balancer or another device can empirically identify a saturation point for a computing device implementing the state-of-the-art hardware, and that saturation point can be referenced by the load balancer as part of a load test, to determine efficient load balancing distributions. Similarly, the load balancer or other device implementing aspects of the disclosure can identify a potential memory bandwidth bottleneck before deploying a new model or application on the computing devices. The load balancer in this way can be used to plan the physical costs for executing a model or other workload, to identify whether a distributed system implementing the workload can meet requirements for accuracy and latency.

For a distributed network of computing devices, new hardware can be added, and applications such as machine learning models can be added or modified during their respective lifetimes. The load balancer can distribute data to reduce overall network latency and the chance of dropped data.

Example Systems:

FIG. 1 is a block diagram of a load balancer 100 distributing data to a distributed network 115 of computing devices 115A-N, according to aspects of the disclosure. The load balancer 100 can receive incoming data 110 for processing on the distributed network 115.

The load balancer 100 can be any combination of hardware, software, and/or firmware located in one or more physical locations and configured for load balancing the incoming data 110. For example, the load balancer 100 can be implemented in software on a device in the distributed network 115 configured as a network endpoint to receive the incoming data 110.

Each computing device 115A-N can host one or more processors and one or more memory devices. For example, computing device A 115A can include processors 117A and memory devices 119A. In general, the processors of a computing device can include a combination of one or more general-purpose processors and one or more hardware accelerators. General-purpose processors can include central processing units (CPUs), microcontrollers, microprocessors, and other devices that can be used generally for computation.

The memory devices of a computing device can be coupled to the general-purpose processors. Memory devices can include any type of device for storing data temporarily or permanently. Examples of memory devices include various types of volatile memory, such as RAM, and cache memory. Memory devices can also include ROM, conventional hard drives, solid-state drives, memory cards, etc. In some examples, a computing device implements a combination of different types of processors with different types of memory devices.

A computing device of the distributed network 115 can also host one or more hardware accelerators. A hardware accelerator is a device configured to perform specialized operations efficiently, such as matrix arithmetic. Hardware accelerators can be custom-designed for implementation as part of a computing device slated for performing a particular workload, such as a machine learning model. The hardware accelerators hosted on the computing device can be customized to efficiently perform certain types of operations frequently used as part of executing a machine learning model, such as matrix multiplication.

Hardware accelerators can also be configured to perform general-purpose computation which is also performable by general-purpose processors like CPUs. Examples of hardware accelerators include ASICs, such as tensor processing units (TPUs), as well as graphics processing units (GPUs). A computing device of the distributed network 115 can host any combination of hardware accelerators coupled to memory devices and general-purpose processors, connected for example through one or more sockets on a logic board or by any other means of connection.

The incoming data 110 can generally include requests, such as queries, to process some input data by an application, service, or program, all of which are generally referred to as workloads. Workloads can be executed in the distributed network 115 by one or more computing devices. The incoming data 110 can be received from one or more user computing devices communicating with the distributed network 115 through an interface, for example by an Application Program Interface (API) exposing workloads running in the distributed network 115 to user computing devices. In addition or alternatively, the incoming data 110 can come from other computing devices that are part of another network of devices. The incoming data 110 can also be data from other devices of a computing platform, which may or may not include the distributed network 115. As another example, the incoming data 110 can come from other applications or services executing on devices external to the distributed network 115 that rely on workloads executing on the distributed network 115. These external devices may also communicate with the distributed network 115 through an API or other interface.

Some workloads, such as machine learning models, may involve the execution of operations on both general-purpose processors and hardware accelerators of a computing device. It has been observed that the processing capabilities of generations of components of a computing device can improve at different rates. For example, improvements to hardware accelerators can grow faster than improvements to general-purpose processors. Disparities in processing performance, measured for example by clock speed or how quickly processors can perform various operations, are more pronounced when a computing device is executing a workload that relies on processing by both general-purpose processors and hardware accelerators.

For instance, execution of a machine learning model may require some operations, such as matrix arithmetic, that are better suited for a hardware accelerator, and other operations, such as general input preprocessing or accessing data from cache memory, that are better suited for execution by a general-purpose processor.

The proportion of operations performed by general-purpose versus hardware accelerators can vary from model-to-model. Further, depending on the complexity and quantity of operations that are performed for executing a particular model, a bottleneck in the memory bandwidth between memory devices and general-purpose processors is more likely to form for devices executing models that rely less on hardware accelerators to perform specialized operations. For example, given the nature of the operations to execute a particular model, more data has to be transferred between processors and memory devices.

Even though the general-purpose processors and hardware accelerators have the processing capability to handle all incoming data without slowing down, the model's requirement for data transfer between these components to perform all the operations in executing the model can become the source of a bottleneck.

According to aspects of the disclosure, the load balancer 100 can receive the incoming data 110, and send data distributions 120 to the distributed network 115 according to a load-balancing strategy and one or more signals that characterize bottlenecks from data transfer between general-purpose processors and memory devices, such as RAM. The signals can include the saturation point for each computing device 115A-N, and performance metrics from the computing devices 115A-N, including memory bandwidth saturation levels 130.

The saturation levels 130 can include individual measures of memory bandwidth for each computing device 115A-N over a period of time, e.g., 3 seconds. The computing devices 115A-N are configured to measure memory bandwidth at various intervals, e.g., 1-5 milliseconds, within the measured period of time. Each computing device 115A-N can be configured to aggregate the measurements, such as by calculating a mean, and reporting the aggregated measurements as a memory bandwidth saturation level to the load balancer 100.

In one example, an operating system for a computing device is configured to obtain memory bandwidth by measuring memory bandwidth as data passes through a socket coupling a memory device to a logic board of the computing device. The operating system can measure memory bandwidth at the socket over multiple intervals in a period of time. The operating system can generate a saturation level, such as by taking the average of memory bandwidth measured at each interval.

For multiple memory devices involved in data transfer during the execution of a workload, the operating system for the computing device can combine measured memory bandwidth across the period of time for each memory device, and aggregate the individual measures to generate the saturation level reported to the load balancer 100. Additionally, each computing device 115A-N can be configured to repeat the measuring and reporting of saturation levels according to a predetermined schedule, for example continuously for each period of time passing while a computing device is executing a workload.

The computing devices 115A-N can be configured to report saturation levels from memory bandwidth in communication between certain types of memory devices and certain types of components, such as general-purpose processors. For example, the saturation levels 130 reported may be generated from measurements only between RAM and general-purpose processors on the computing device. By reporting saturation levels between general-purpose processors and RAM, a computing device can provide information that the load balancer 100 can use to avoid or mitigate bottlenecks in the transfer of data between components of the computing device.

Figure 2:
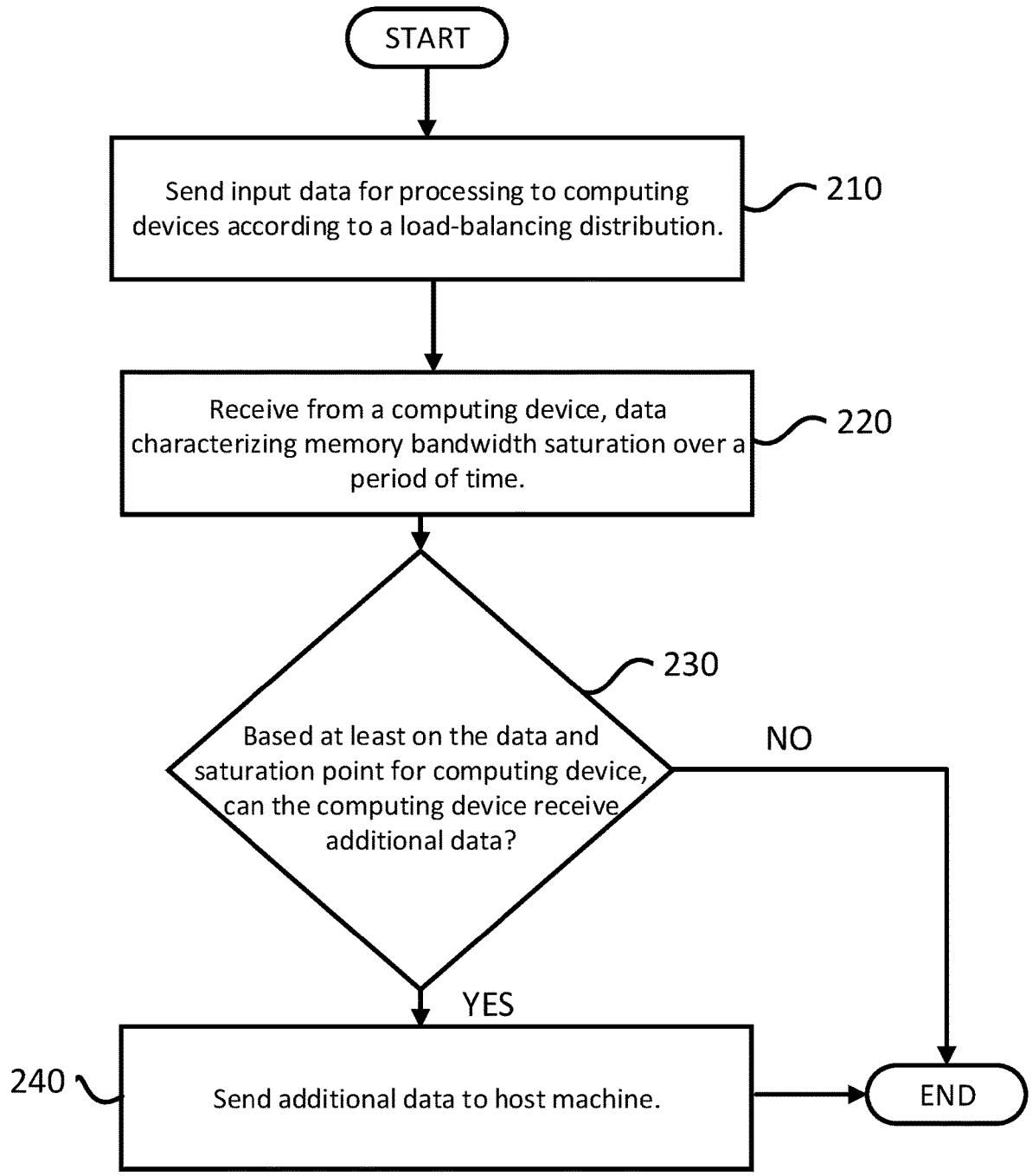
FIG. 2 is a flow diagram of an example process for load balancing with memory bandwidth saturation levels, according to aspects of the disclosure.

As described in more detail herein with reference to FIG. 2, the load balancer 100 can determine the availability of a computing device for receiving additional data for processing based on whether the additional data would cause the computing device to operate past its saturation point. Also as described with reference to FIGS. 2-3, the saturation point can be predetermined or calculated by the load balancer 100 or another component coupled to the load balancer 100. If the reported saturation level for a computing device does not meet or exceed its respective saturation point, then the load balancer 100 can distribute additional data from the incoming data 110 to the computing device for processing.

The performance metrics can also include other signals that the load balancer 100 can use in addition to the saturation levels 130, such as reported processor and/or hardware accelerator utilization measuring the ratio of current utilization for processors of each computing device 115A-N versus their respective maximum utilization. Similarly, the performance metrics can also include memory device utilization measuring the ratio of current utilization of memory devices for each computing device 115A-N versus the respective maximum capacity for the memory devices. In addition or alternatively, the load balancer 100 can receive any of a variety of types of signals for use in load balancing the incoming data 110, in addition to the saturation levels 130. For example, the load balancer 100 can also use as a signal the network latency in communicating data back and forth from a device implementing the load balancer and the computing devices 115A-N.

Once one or more computing devices have been identified as available for receiving additional data, such as by comparing saturation levels to respective saturation points of the one or more computing devices as described herein, the load balancer 100 can send the data distributions 120 to the one or more available computing devices according to a load-balancing strategy. A load-balancing strategy refers to any procedure or heuristic that a load balancer can be configured to apply as part of determining the order in which data is distributed to available computing devices. The load balancer 100 can be configured to implement any of a variety of different load-balancing strategies. For example, one strategy can be to distribute data according to a round-robin procedure, in which the load balancer 100 cycles through available computing devices for receiving additional data. As another example, the load balancer 100 can be configured to distribute data to available computing devices based on which available device is under the least amount of load, such as the lowest saturation level relative to a computing device's saturation point.

The distributed network 115 can transmit processed data as outgoing data 125. The outgoing data 125 can include responses to queries or requests in the incoming data 110, passed back to the requesting computing devices.

Example Methods:

FIG. 2 is a flow diagram of an example process 200 for load balancing a distributed network of computing devices, according to aspects of the disclosure. A load balancer, such as the load balancer 100 of FIG. 1, appropriately configured in accordance with aspects of the disclosure, can perform the process 200.

The load balancer sends input data to a plurality of computing devices for processing according to a load-balancing distribution, according to block 210. The input data can include requests, such as queries, for processing data according to a workload executing on the plurality of computing devices, such as the computing devices 115A-N as described with reference to FIG. 1. The load-balancing distribution can be determined according to a load-balancing strategy applied to devices that the load balancer has previously determined to be available. If this is the initial distribution of data for the load balancer, then the load balancer can distribute data according to a default strategy, for example by evenly distributing the data across each of the plurality of computing devices.

The load balancer receives, from a computing device, data characterizing memory bandwidth saturation levels over a period of time, according to block 220. Each computing device can be configured to measure memory bandwidth between processors and memory devices over a period of time, as described herein with reference to FIG. 1. Memory bandwidth can be measured in gigabytes per second, or with other measurements suited for the computing device, e.g., megabytes, terabytes, etc. The data received can be part of performance metrics that include other signals that the load balancer can use as part of load balancing. As described herein with reference to FIG. 1, those other metrics can include processor utilization, and memory utilization.

Based at least on the data characterizing memory bandwidth saturation levels over the period of time and a saturation point for the computing device, according to block 230, the load balancer determines whether a computing device can receive additional data. If so ("YES") then the load balancer sends additional data to the computing device, according to block 240. As part of determining whether the computing device can receive additional data, the load balancer compares the received saturation level to a saturation point for the computing device. The saturation point can be predetermined, for example before the computing device begins executing a workload, and provided to the load balancer. The load balancer or another component in communication with the load balancer determines the saturation point for the computing device. The load balancer or another component can determine the saturation point based on the relationship between access latency and memory bandwidth, described herein with reference to FIG. 3.

Figure 3:
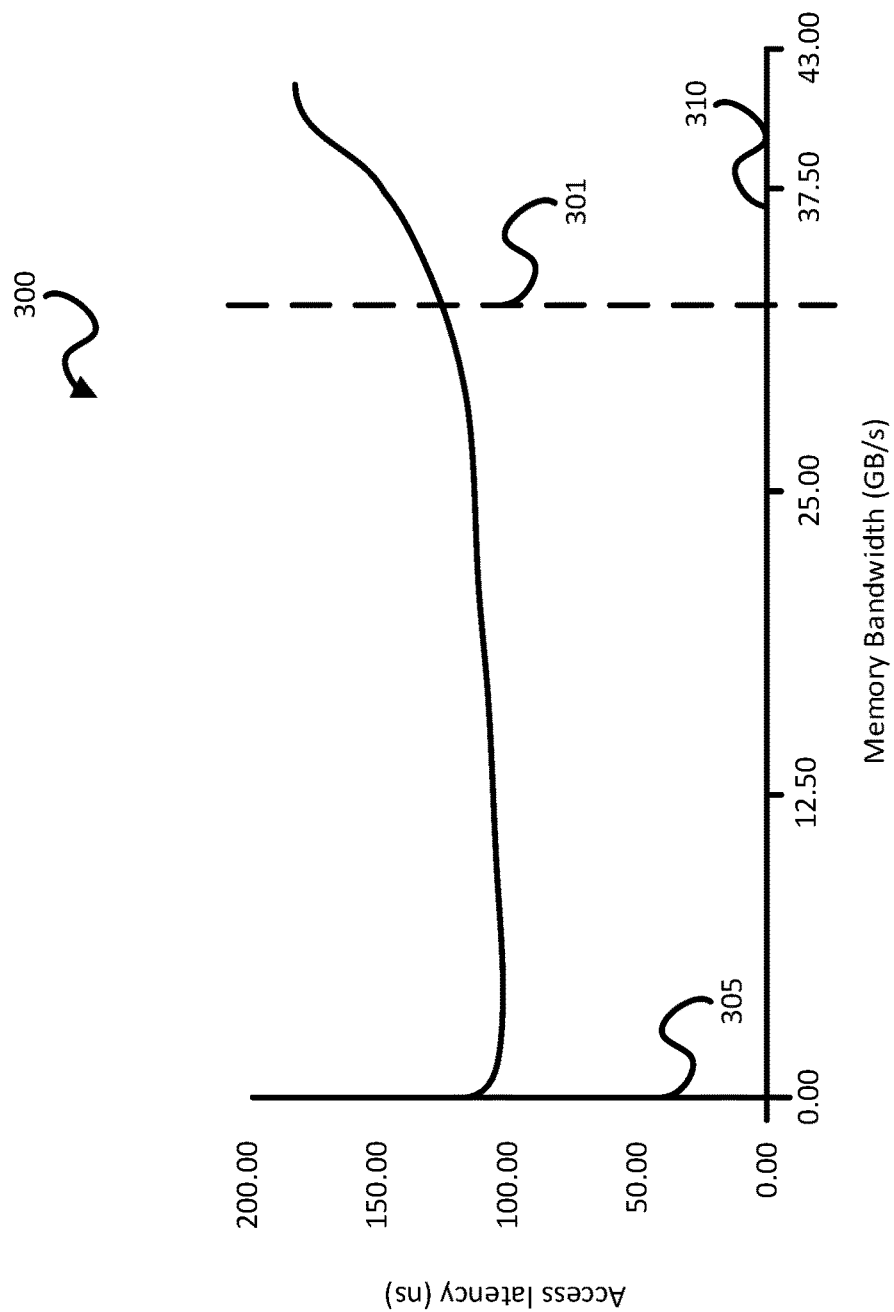
FIG. 3 is a graph tracking the relationship between access latency and memory bandwidth for a computing device.

FIG. 3 is a graph 300 tracking the relationship between access latency and memory bandwidth for a computing device. The y-axis 305 represents access latency measured in nanoseconds (ns). Access latency refers to the latency in writing or reading data to or from a memory device on the computing device. The x-axis 310 represents memory bandwidth, measured in gigabytes per second (GB/s), and corresponding to the amount of data passing to and from memory devices.

The graph 300 tracks how increased memory bandwidth affects access latency. Initially and up to a particular memory bandwidth 301, access delay is relatively linear in relation to the increasing rate at which data is transferred to and from the memory for the measured computing device. However, from the memory bandwidth 301 onward, the graph 300 shows the rate of change of access latency to increase faster than when the measured memory bandwidth was below the memory bandwidth 301. The memory bandwidth 301 can be identified as the point at which the graph 300 begins to slope upwards at a rate faster than a constant or linear relationship between access latency and bandwidth identified for lower memory bandwidth.

The load balancer or component tasked with identifying the saturation point can be configured to subject the computing device to increasing amounts of data for processing, and receive, from the computing device, measurements for memory bandwidth and access latency between memory devices and processors of the device. For example, the computing device can be configured to run various workloads for measuring access latency. One workload when executed on the computing device can be configured to measure latency in communicating data to and from processors and memory devices on the computing device. The same or a different workload executing on the computing device can be configured to gradually increase the rate at which data is sent to the computing device, and the computing device can report latency as the rate of data communicated between processors and memory devices increases. As another example, access latency can be determined or estimated based on the end-to-end latency measured between sending an input query to the computing device and receiving a response The load balancer or component can analyze the received data, such as the graph 300, and identify the saturation point based on how the data changes. As part of determining the saturation point, the load balancer or component can be configured to receive a predetermined latency threshold, and use the predetermined latency threshold to determine the saturation point. For instance, the predetermined latency threshold may specify a maximum tolerated rate of change between access latency and memory bandwidth. The predetermined latency threshold may limit non-linear increases of access latency as a function of memory bandwidth.

Therefore, when the load balancer or component determines that access latency is increasing non-linearly, e.g., exponentially, with increasing memory bandwidth, then the load balancer can assign the memory bandwidth prior to the non-linear increase as the saturation point. In graph 300, the memory bandwidth 301 is identified as the saturation point, based on the rate of change for the access latency before and after the memory bandwidth 301. In some implementations, rather than determine the saturation point based on increases in access latency, the load balancer or other component can process measures of end-to-end latency between sending input queries to the computing device and receiving respective responses for various different memory bandwidths. The load balancer or other appropriately configured component can identify non-linear increases in the end-to-end latency, for example measured in milliseconds, and assign a saturation point as described herein.

Note in this example that the saturation point comes before the maximum memory bandwidth for the computing device, at 43 gigabytes per second. The memory bandwidth 301 comes before the computing device operates at or near its theoretical maximum bandwidth. Had the saturation point not been identified as the memory bandwidth 301 in this example, then the load balancer would potentially send additional data to the computing device as technically having availability for additional data. In that case, the access latency for the computing device would increase substantially, for example more than linearly, bottlenecking the computing device and degrading performance overall.

When the bottleneck for processing data on a computing device is memory bandwidth between memory devices and processors, increased latency to access memory stored on the memory devices can directly impact the overall delay of the computing device in responding to incoming queries. The delay can occur even when the individual components of the computing device, such as, its memory devices and processors, separately have capacity for processing additional data.

The predetermined latency threshold may be based on external requirements for overall latency of the distributed network in responding to requests from incoming data. These external requirements can be based on service-level objectives or other conditions imposed on the distributed network, for example to ensure a minimum quality of interaction between the distributed network and user computing devices sending requests for processing data. The external requirements may also be imposed to prevent queries sent to the distributed network from timeout. If requirements or expectations for the distributed network change, then the load balancer or appropriately configured component can receive an updated latency threshold, and calculate new saturation points for the computing devices in light of the new requirements.

As another example for determining the saturation point, the predetermined latency threshold may specify a maximum tolerated access latency. The load balancer or component can identify the saturation point as the memory bandwidth before that maximum tolerated access latency is met. As another example, the load balancer or component can determine where the rate of change between access latency and memory bandwidth jumped the highest, and designate the memory bandwidth before that jump as the saturation point.

However the saturation point is received or computed, the load balancer can compare current memory bandwidth saturation levels against the respective saturation point for each computing device, and determine whether the computing device can receive additional data. The load balancer can use other metrics in conjunction with the reported saturation levels. Other metrics can include the utilization rate of the processors, as well as the maximum memory capacity available for memory devices on the computing device.

Returning to FIG. 2, if the load balancer determines that the computing device cannot receive additional data ("NO"), the load balancer does not provide additional data to the computing device, and the process 200 ends. The load balancer can send the additional data according to other computing devices that the load balancer has determined can receive the additional data. The load balancer can perform the process 200 concurrently or sequentially with respect to multiple computing devices in the distributed network. For example, if the load balancer on execution of the process 200 determines that a first computing device cannot receive additional data, then the load balancer can perform the process 200 with respect to a second computing device. The load balancer can determine whether the second computing device can receive the additional data, based on received memory bandwidth saturation levels received form the second computing device. If so ("YES"), then the load balancer sends additional data to the second computing device.

Figure 4A:
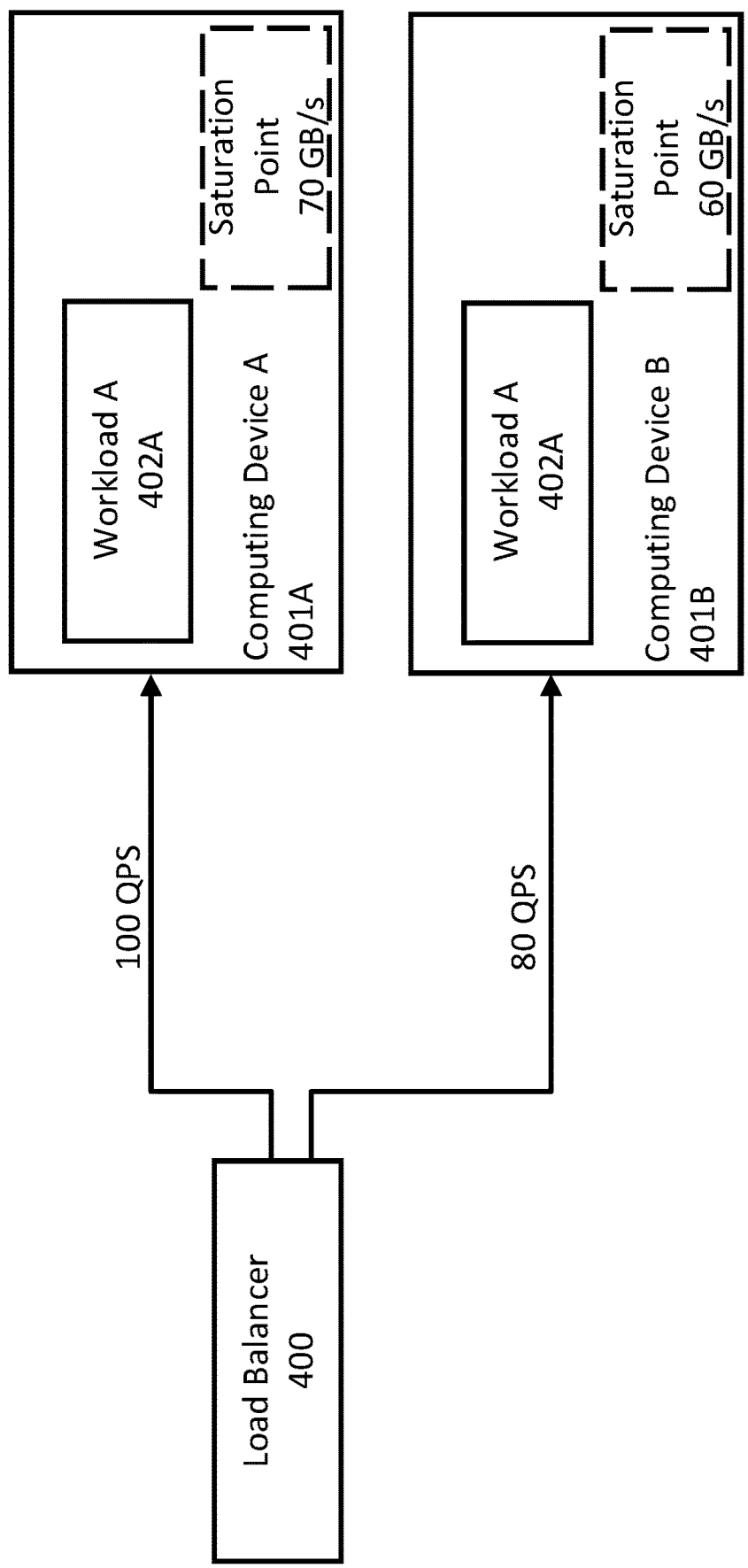
FIG. 4A is a block diagram of an example load balancer adjusting load balancing for different computing devices, according to aspects of the disclosure.

FIG. 4A is a block diagram of an example load balancer 400 adjusting load balancing for different computing devices 401A-B, according to aspects of the disclosure. For purposes of illustration, the computing device A 401A is determined to have a saturation point of 70 GB/s, while the computing device B 401B is determined to have a saturation point of 60 GB/s. The computing devices 401A-B may have different saturation points, for example, because the computing devices are implemented with different hardware, including different types or generations of processors and/or memory devices.

The load balancer 400 can receive saturation levels and the respective saturation point of each computing device 401A-B, and determine how to distribute the incoming data as described herein with reference to FIGS. 1-3. FIG. 4A shows that for the same workload A 402A executed on both computing devices 401A-B, the load balancer 400 will distribute data according to different distributions. Specifically, the load balancer 400 may distribute data at a rate of 100 queries-per-second (QPS) for the computing device A 401A, while the load balancer 400 may distribute data at a rate of 80 QPS for the computing device B 401B. QPS can be used to measure the rate of data distribution to a computing device. The peak QPS represents the highest rate of queries per second that can be sent to a computing device without causing the computing device to exceed its saturation point as it handles the incoming requests.

The respective rates of 100 and 80 QPS reflect the peak QPS possible without causing the saturation levels of the computing devices 401A-B to exceed their respective saturation points of 70 and 60 GB/s. For the computing device 401A, for example, the load balancer 400 has determined that 100 QPS is the peak QPS for the device, and does not send data faster than 100 QPS so as to reduce overall latency and/or dropped queries that are not handled in a timely fashion.

Figure 4B:
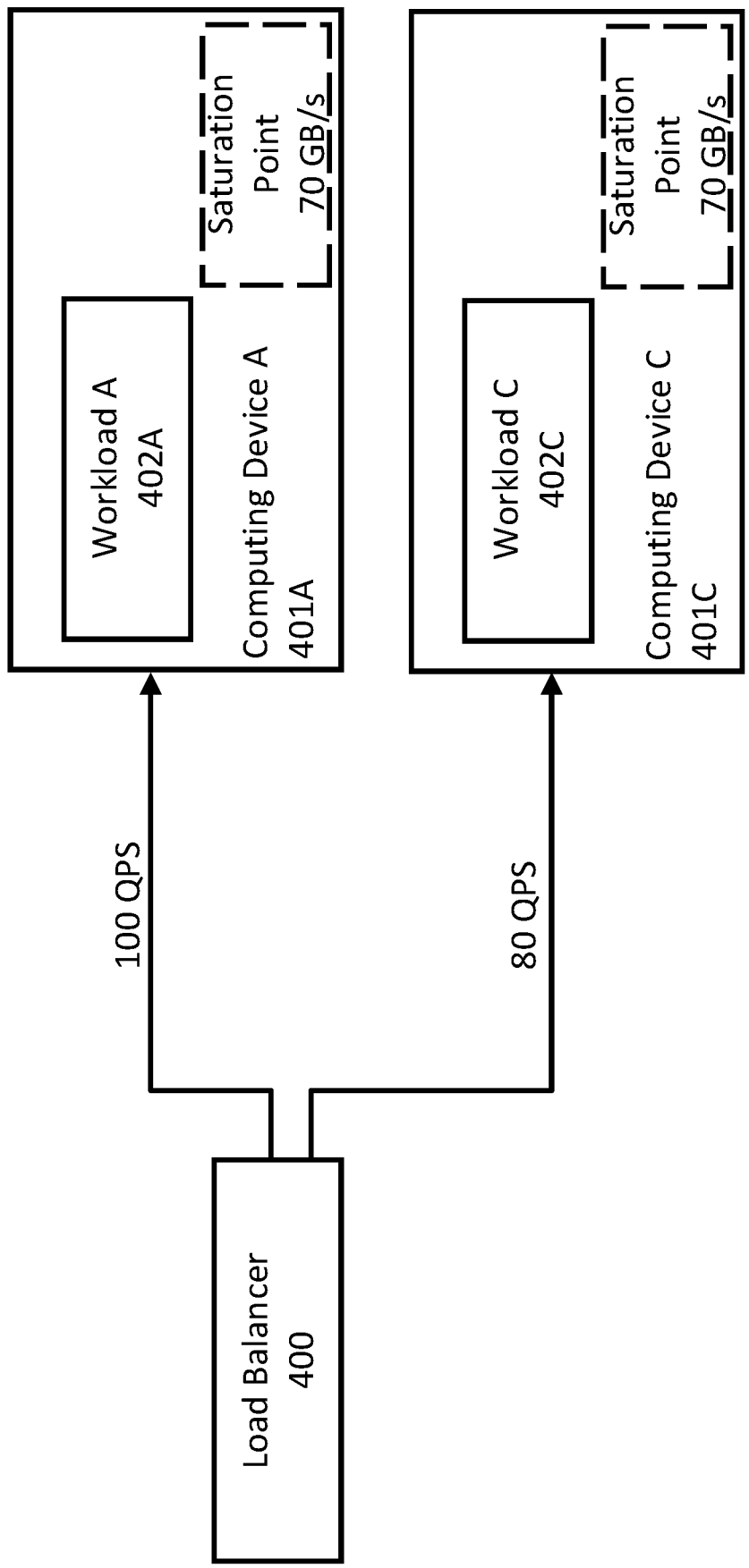
FIG. 4B is a block diagram of the example load balancer adjusting load balancing for different workloads, according to aspects of the disclosure.

FIG. 4B is a block diagram of the example load balancer 400 adjusting load balancing for different workloads 402A, C, according to aspects of the disclosure. In FIG. 4B, computing device A 401A and computing device C 401C have the same hardware configuration, and correspondingly have the same saturation point of 70 GB/s. However, the computing device A 401A is executing workload A 402A, while the computing device 402C is executing workload C 402C. For example, the workload 402A can be a machine learning model, and the workload 402C can be a modified version of the machine learning model. A modification to the machine learning model 402A can be, for example, additional or fewer layers to the model 402A when the model is a neural network, or changes to the types of operations performed as part of executing the model 402A.

FIG. 4B shows that, for devices with the same saturation point but different workloads, the load balancer 400 may distribute data according to different distributions. Specifically, the load balancer 400 may distribute data at a rate of 100 QPS for the computing device A 401A, while distributing data at a rate of 80 QPS for the computing device C 401C. As described above with reference to FIG. 4A, the difference in peak QPS attainable reflects what the load balancer 400 has determined it can distribute to the computing devices without causing the devices to operate in excess of their respective saturation points. Because computing devices 401A, C have the same saturation point, the variable in FIG. 4B is the difference between executing workload A versus workload B. In this example, the workloads 402A, C imposed different computational requirements on the different components, such as general-purpose processors, hardware accelerators, memory devices, and/or data transfer between memory and processors, of the devices 401A, C. One possible explanation for the difference in peak QPS distributed between computing devices 401A, C, can be that operations required to process the query according to the workload C 402C impose a larger bottleneck than workload A 402A on memory bandwidth between memory devices and general-purpose processors of the computing devices.

Figure 5:
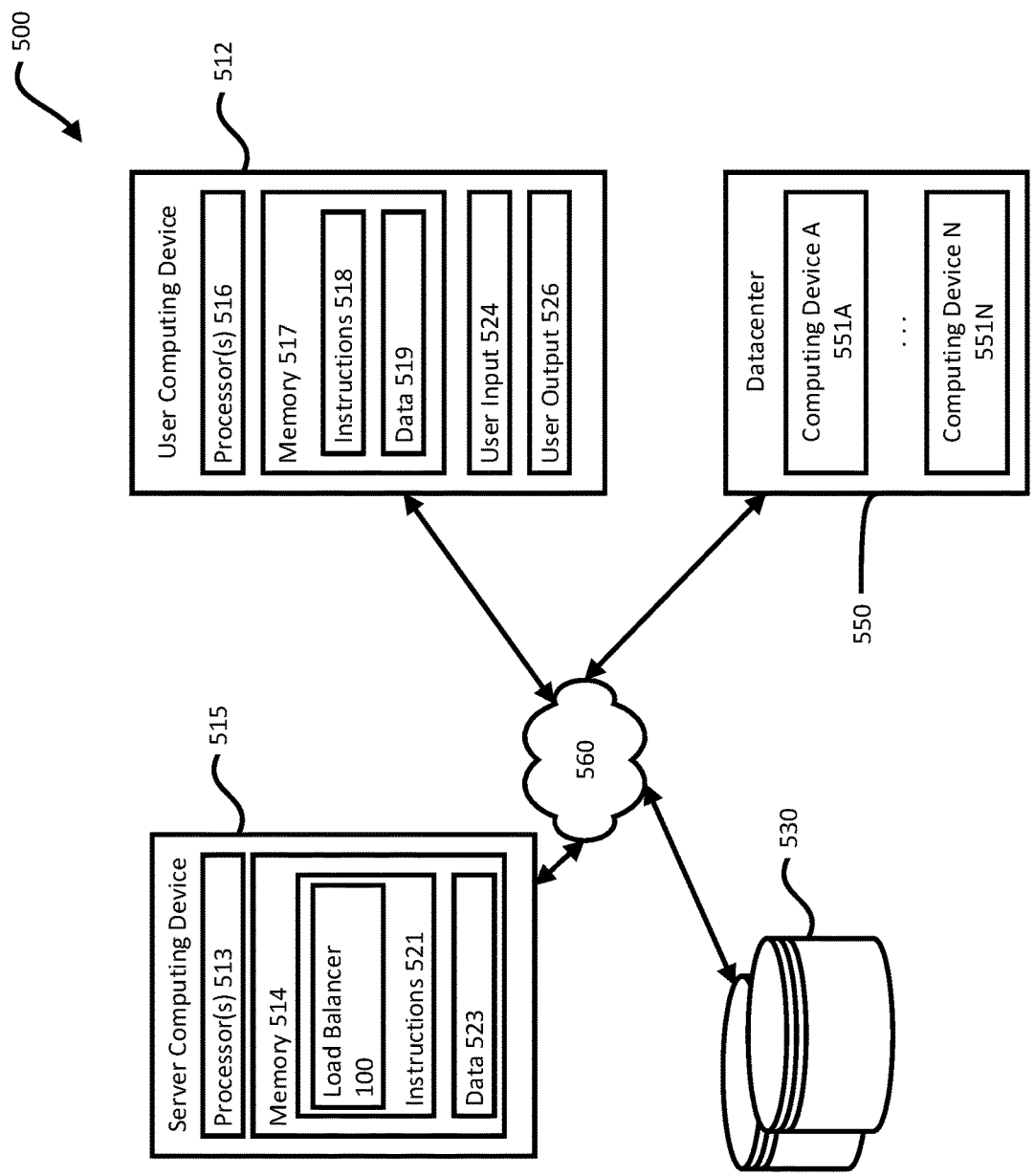
FIG. 5 is a block diagram of an example computing environment implementing the load balancer, according to aspects of the disclosure.

Example Computing Environment:

FIG. 5 is a block diagram of an example computing environment 500 implementing the load balancer 100, according to aspects of the disclosure. The load balancer 100 can be implemented on one or more devices having one or more processors in one or more locations, such as in server computing device 515. User computing device 512 and the server computing device 515 can be communicatively coupled to one or more storage devices 530 over a network 560. The storage device(s) 530 can be a combination of volatile and non-volatile memory, and can be at the same or different physical locations than the computing devices 512, 515. For example, the storage device(s) 530 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 515 can include one or more processors 513 and memory 514. The memory 514 can store information accessible by the processor(s) 513, including instructions 521 that can be executed by the processor(s) 513. The memory 514 can also include data 523 that can be retrieved, manipulated or stored by the processor(s) 513. The memory 514 can be a type of non-transitory computer readable medium capable of storing information accessible by the processor(s) 513, such as volatile and non-volatile memory. The processor(s) 513 can include one or more central processing units (CPUs), graphic processing units (GPUs), field-programmable gate arrays (FPGAs), and/or application-specific integrated circuits (ASICs), such as tensor processing units (TPUs).

The instructions 521 can include one or more instructions that when executed by the processor(s) 513, causes the one or more processors to perform actions defined by the instructions. The instructions 521 can be stored in object code format for direct processing by the processor(s) 513, or in other formats including interpretable scripts or collections of independent source code modules that are interpreted on demand or compiled in advance. The instructions 521 can include instructions for implementing the load balancer 100 consistent with aspects of this disclosure. The load balancer 100 can be executed using the processor(s) 513, and/or using other processors remotely located from the server computing device 515.

The data 523 can be retrieved, stored, or modified by the processor(s) 513 in accordance with the instructions 521. The data 523 can be stored in computer registers, in a relational or non-relational database as a table having a plurality of different fields and records, or as JSON, YAML, proto, or XML documents. The data 523 can also be formatted in a computer-readable format such as, but not limited to, binary values, ASCII or Unicode. Moreover, the data 523 can include information sufficient to identify relevant information, such as numbers, descriptive text, proprietary codes, pointers, references to data stored in other memories, including other network locations, or information that is used by a function to calculate relevant data.

The user computing device 512 can also be configured similar to the server computing device 515, with one or more processors 516, memory 517, instructions 518, and data 519. The user computing device 512 can also include a user output 526, and a user input 524. The user input 524 can include any appropriate mechanism or technique for receiving input from a user, such as keyboard, mouse, mechanical actuators, soft actuators, touchscreens, microphones, and sensors.

The server computing device 515 can be configured to transmit data to the user computing device 512, and the user computing device 512 can be configured to display at least a portion of the received data on a display implemented as part of the user output 526. The user output 526 can also be used for displaying an interface between the user computing device 512 and the server computing device 515. The user output 526 can alternatively or additionally include one or more speakers, transducers or other audio outputs, a haptic interface or other tactile feedback that provides non-visual and non-audible information to the platform user of the user computing device 512.

Although FIG. 5 illustrates the processors 513, 516 and the memories 514, 517 as being within the computing devices 515, 512, components described in this specification, including the processors 513, 516 and the memories 514, 517 can include multiple processors and memories that can operate in different physical locations and not within the same computing device. For example, some of the instructions 521, 518 and the data 523, 519 can be stored on a removable SD card and others within a read-only computer chip. Some or all of the instructions and data can be stored in a location physically remote from, yet still accessible by, the processors 513, 516. Similarly, the processors 513, 516 can include a collection of processors that can perform concurrent and/or sequential operation. The computing devices 515, 512 can each include one or more internal clocks providing timing information, which can be used for time measurement for operations and programs run by the computing devices 515, 512.

The server computing device 515 can be connected over the network 560 to a datacenter 550 housing computing devices 551A-N. The datacenter 550 can be one of multiple datacenters or other facilities in which various types of computing devices, such as hardware accelerators, are located. Together, the computing devices 551A-N and other computing devices in other datacenters or facilities can form a distributed network. The load balancer 100 is configured to load balance incoming data to the computing devices 551A-N as described herein.

As described herein, each computing device 551A-N can implement one or more processors, including a combination of general-purpose processors like CPUs, and one or more hardware accelerators, such as FPGAs, GPUs, TPUs, and ASICs in general. As described with reference to the memories 514, 517, the computing devices 551A-N can also implement any of a variety of types of memory devices. Individual components can be coupled together, for example, through a main logic or circuit board.

The server computing device 515 can be configured to receive requests and/or queries to process data from the user computing device 512 on host devices 551A-N in the datacenter 550. For example, the environment 500 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 512 may receive and transmit data specifying target computing resources to be allocated for executing a neural network trained to perform a particular machine learning task. The load balancer 100 can receive a query or request to execute a neural network on the computing devices 551A-N, along with some data.

The devices 512, 515, and the datacenter 550 can be capable of direct and indirect communication over the network 560. For example, using a network socket, the user computing device 512 can connect to a service operating in the datacenter 550 through an Internet protocol. The devices 515, 512 can set up listening network sockets that may accept an initiating connection for sending and receiving information. The network 560 itself can include various configurations and protocols including the Internet, World Wide Web, intranets, virtual private networks, wide area networks, local networks, and private networks using communication protocols proprietary to one or more companies. The network 560 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 560, in addition or alternatively, can also support wired connections between the devices 512, 515, and the datacenter 550, including over various types of Ethernet connection.

Although a single server computing device 515, user computing device 512, and datacenter 550 are shown in FIG. 5, it is understood that the aspects of the disclosure can be implemented according to a variety of different configurations and quantities of computing devices, including in paradigms for sequential or parallel processing, or over a distributed network of multiple devices.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
sending, by one or more processors, input data to a plurality of computing devices configured to process the input data, wherein a respective portion of the input data is sent to each of the plurality of computing devices according to a load-balancing distribution;
receiving, from a first computing device of the plurality of computing devices, data characterizing memory bandwidth for a memory device on the first computing device over a period of time, wherein the portion of the input data sent to the first computing device comprises a request to the first computing device to return output data by processing the data using a machine learning model;
determining, at least from the data characterizing the memory bandwidth and a memory bandwidth saturation point for the first computing device, that the first computing device can process additional data within a predetermined latency threshold, the predetermined latency threshold specifying a maximum tolerated rate of change between access latency and the memory bandwidth, and the access latency being a measure of time to access data stored on the memory device, wherein the memory bandwidth saturation point for the first computing device is determined by:
receiving measures of access latency at different memory bandwidths, each memory bandwidth corresponding to a respective measure of access latency, and
identifying the memory bandwidth saturation point for the first computing device as a point where a graph of the access latency as a function of the memory bandwidth begins to exhibit a non-linear relationship such that an increase in access latency per unit increase of memory bandwidth is greater than another increase in access latency per unit increase of memory bandwidth exhibiting a linear relationship between the access latency and the memory bandwidth;
identifying a first memory bandwidth corresponding to the memory bandwidth saturation point; and
in response to determining that the first computing device can process additional data within the predetermined latency threshold, sending the additional data to the first computing device for processing by the first computing device.

2. The method of claim 1, wherein the memory bandwidth for the first computing device comprises measurements of a rate of data transferred between a processor and the memory device during each of a plurality of time intervals within the time period.

3. The method of claim 1, wherein the memory bandwidths higher than the first memory bandwidth correspond to measures of access latency that exceed the predetermined latency threshold.

4. The method of claim 1, wherein the first memory bandwidth is less than a maximum memory bandwidth attainable for the computing device.

5. The method of claim 1,
wherein the predetermined latency threshold is at least partially based on a service level objective defining a maximum delay for the first computing device to respond to the request.

6. The method of claim 1, wherein the first computing device comprises one or more first computing device processors and/or one or more other memory devices, and wherein determining that the first computing device can receive additional data further comprises determining that the first computing device can receive additional data based on respective performance metrics, other than the memory bandwidth saturation point, for one or more of the first computing device processors and/or the other memory devices.

7. The method of claim 1, wherein the method further comprises:
- determining that the first computing device cannot process additional data within the predetermined latency threshold, and
- in response, sending the additional data to a second computing device different from the first computing device.

8. A system comprising:
- one or more processors;
- a plurality of computing devices; and
- one or more non-transitory computer readable storage media coupled to the one or more processors and storing instructions, which, when executed by the one or more processors, causes the one or more processors to perform operations comprising:
  - sending input data to the plurality of computing devices configured to process the input data, wherein a respective portion of the input data is sent to each of the plurality of computing devices according to a load-balancing distribution;
  - receiving, from a first computing device of the plurality of computing devices, data characterizing memory bandwidth for a memory device on the first computing device over a period of time, wherein the portion of the input data sent to the first computing device comprises a request to the first computing device to return output data by processing the data using a machine learning model;
  - determining, at least from the data characterizing the memory bandwidth and a memory bandwidth saturation point for the first computing device, that the first computing device can process additional data within a predetermined latency threshold, the predetermined latency threshold specifying a maximum tolerated rate of change between access latency and the memory bandwidth, and the access latency being a measure of time to access data stored on the memory device, wherein the memory bandwidth saturation point for the first computing device is determined by:
    - receiving measures of access latency at different memory bandwidths, each memory bandwidth corresponding to a respective measure of access latency, and
    - identifying the memory bandwidth saturation point for the first computing device as a point where a graph of the access latency as a function of the memory bandwidth begins to exhibit a non-linear relationship such that an increase in access latency per unit increase of memory bandwidth is greater than another increase in access latency per unit increase of memory bandwidth exhibiting a linear relationship between the access latency and the memory bandwidth;
  - identifying a first memory bandwidth corresponding to the memory bandwidth saturation point; and
  - in response to the determining that the first computing device can process additional data within the predetermined latency threshold, sending the additional data to the first computing device for processing by the first computing device.

9. The system of claim 8,
- wherein the first computing device comprises one or more general-purpose processors, one or more memory devices, and one or more hardware accelerators; and
- wherein the first computing device is configured to:
  - receive the input data and,
  - process the input data through the machine learning model, wherein processing the input data comprises executing a first portion of a machine learning model using the one or more general-purpose processors, and executing a second portion of the machine learning model different from the first portion and using the one or more hardware accelerators.

10. The system of claim 8, wherein the memory bandwidth for the first computing device comprises measurements of a rate of data transferred between a processor and the memory device during each of a plurality of time intervals within the time period.

11. The system of claim 8, wherein the memory bandwidths higher than the first memory bandwidth correspond to measures of access latency that exceed the predetermined latency threshold.

12. The system of claim 8, wherein the first memory bandwidth is less than a maximum memory bandwidth attainable for the computing device.

13. The system of claim 8,
- wherein the predetermined latency threshold is at least partially based on a service level objective defining a maximum delay for the first computing device to respond to the request.

14. The system of claim 8, wherein the first computing device comprises one or more first computing device processors and/or one or more other memory devices, and wherein determining that the first computing device can receive additional data further comprises determining that the first computing device can receive additional data based on respective performance metrics, other than the memory bandwidth saturation point, for one or more of the first computing device processors and/or the other memory devices.

15. The system of claim 8, wherein the method further comprises:
- determining that the first computing device cannot process additional data within the predetermined latency threshold, and
- in response, sending the additional data to a second computing device different from the first computing device.

16. One or more non-transitory computer-readable storage media encoded with instructions that, when executed by one or more processors, cause the one or more processors to perform operations comprising:
- sending input data to a plurality of computing devices configured to process the input data, wherein a respective portion of the input data is sent to each of the plurality of computing devices according to a load-balancing distribution;
- receiving, from a first computing device of the plurality of computing devices, data characterizing memory bandwidth for a memory device on the first computing device and over a period of time, wherein the portion of the input data sent to the first computing device comprises a request to the first computing device to return output data by processing the data using a machine learning mode;
- determining, at least from the data characterizing the memory bandwidth and a memory bandwidth saturation point for the first computing device, that the first computing device can process additional data within a predetermined latency threshold, the predetermined latency threshold specifying a maximum tolerated rate of change between access latency and the memory bandwidth, and the access latency being a measure of time to access data stored on the memory device, wherein the memory bandwidth saturation point for the first computing device is determined by:

receiving measures of access latency at different memory bandwidths, each memory bandwidth corresponding to a respective measure of access latency, and identifying the memory bandwidth saturation point for the first computing device as a point where a graph of the access latency as a function of the memory bandwidth begins to exhibit a non-linear relationship such that an increase in access latency per unit increase of memory bandwidth is greater than another increase in access latency per unit increase of memory bandwidth exhibiting a linear relationship between the access latency and the memory bandwidth;

identifying a first memory bandwidth corresponding to the memory bandwidth saturation point; and in response to the determining that the first computing device can process additional data within the predetermined latency threshold, sending the additional data to the first computing device for processing by the first computing device.

17. The computer-readable storage media of claim 16, wherein the memory bandwidth for the first computing device comprises measurements of a rate of data transferred between a processor and the memory device during each of a plurality of time intervals within the time period.

18. The computer-readable storage media of claim 16, wherein the memory bandwidths higher than the first memory bandwidth correspond to measures of access latency that exceed the predetermined latency threshold.

* * * * *